(12) United States Patent
Kraker

(10) Patent No.: US 12,334,072 B2
(45) Date of Patent: *Jun. 17, 2025

(54) NETWORK SOURCE IDENTIFICATION VIA AUDIO SIGNALS

(71) Applicant: GOOGLE LLC, Mountain View, CA (US)

(72) Inventor: Peter Kraker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,710

(22) Filed: Oct. 31, 2023

(65) Prior Publication Data

US 2024/0062758 A1    Feb. 22, 2024

Related U.S. Application Data

(63) Continuation of application No. 17/516,383, filed on Nov. 1, 2021, now Pat. No. 11,837,230, which is a
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 40/205* (2020.01); *G06N 5/04* (2013.01);
(Continued)

(58) Field of Classification Search
CPC ..... G10L 15/22; G10L 15/1822; G10L 15/30; G10L 25/51; G10L 2015/223;
(Continued)

(56) References Cited

U.S. PATENT DOCUMENTS

| 8,185,100 B2 | 5/2012 | Jones et al. |
| 10,013,978 B1 | 7/2018 | Bhaya et al. |

(Continued)

FOREIGN PATENT DOCUMENTS

| CN | 102177537 | 9/2011 |
| CN | 108140177 | 6/2018 |

(Continued)

OTHER PUBLICATIONS

Intellectual Property India; Hearing Notice issued in Application No. 202027052362; 2 pages; dated Feb. 6, 2024.
(Continued)

*Primary Examiner* — Abul K Azad
(74) *Attorney, Agent, or Firm* — Gray Ice Higdon

(57) ABSTRACT

Network source identification via audio signals is provided. A system receives data packets with an input audio signal from a client device. The system identifies a request. The system selects a digital component provided by a digital component provider device. The system identifies audio chimes stored in memory of the client device. The system matches, based on a policy, an identifier of the digital component provider device to a first audio chime stored in the memory of the client device. The system determines, based on a characteristic of the first audio chime, a configuration to combine the digital component with the first audio chime. The system generates an action data structure with the digital component, an indication of the first audio chime, and the configuration. The system transmits the action data structure to the client device to cause the client device to generate an output audio signal.

18 Claims, 4 Drawing Sheets

Related U.S. Application Data continuation of application No. 16/482,572, filed as application No. PCT/US2018/056841 on Oct. 22, 2018, now Pat. No. 11,164,580.

(51) Int. Cl.

| | |
|---|---|
| *G06F 40/205* | (2020.01) |
| *G06N 5/04* | (2023.01) |
| *G06N 20/00* | (2019.01) |
| *G10L 15/18* | (2013.01) |
| *G10L 15/30* | (2013.01) |
| *G10L 25/51* | (2013.01) |
| *H04M 3/42* | (2006.01) |
| *H04M 19/04* | (2006.01) |

(52) U.S. Cl.
CPC .......... *G06N 20/00* (2019.01); *G10L 15/1822* (2013.01); *G10L 15/30* (2013.01); *G10L 25/51* (2013.01); *H04M 3/42051* (2013.01); *H04M 19/041* (2013.01); *G10L 2015/223* (2013.01); *G10L 2015/228* (2013.01)

(58) Field of Classification Search
CPC .......... G10L 2015/228; G10L 21/0364; G06F 3/167; G06F 40/205; G06N 5/04; G06N 20/00; H04M 3/42051; H04M 19/041; H04M 1/2535
See application file for complete search history.

(56) References Cited

U.S. PATENT DOCUMENTS

| | | | | |
|---|---|---|---|---|
| 10,038,419 B1* | 7/2018 | Elliot | ..................... | H03G 5/025 |
| 10,602,268 B1* | 3/2020 | Soto | ........................ | G10L 25/51 |
| 11,164,580 B2* | 11/2021 | Kraker | ..................... | G06F 3/167 |
| 11,837,230 B2* | 12/2023 | Kraker | ..................... | G10L 15/22 |
| 2004/0196963 A1 | 10/2004 | Appelman et al. | | |
| 2011/0054647 A1 | 3/2011 | Chipchase et al. | | |
| 2017/0188168 A1 | 6/2017 | Lyren et al. | | |
| 2017/0236524 A1 | 8/2017 | Ray et al. | | |
| 2018/0176081 A1 | 6/2018 | Zhong | | |
| 2018/0247654 A1 | 8/2018 | Bhaya et al. | | |
| 2019/0034536 A1 | 1/2019 | Papp | | |
| 2020/0098386 A1 | 3/2020 | Smith et al. | | |
| 2022/0059092 A1 | 2/2022 | Kraker | | |

FOREIGN PATENT DOCUMENTS

| | | |
|---|---|---|
| CN | 108521858 | 9/2018 |
| CN | 108551766 | 9/2018 |
| EP | 1677499 | 7/2006 |
| WO | 2016091001 | 6/2016 |

OTHER PUBLICATIONS

China National Intellectual Property Administration; Grant Notice issued in Application No. 201880028322.3; 4 pages; dated Jun. 30, 2023.
China National Intellectual Property Administration; Notification of First Office Action issued in Application No. 201880028322.3; 14 pages; dated Jan. 18, 2023.
Intellectual Property India; Examination Report issued in Application No. 202027052362; 6 pages; dated Dec. 10, 2021.
European Patent Office, Intention to Grant issued in EP Application No. 18 797 482.9, 55 pages; dated Oct. 19, 2020.
Patent Office; Foreign Search Report on PCT/US2018/056841; 15 pages; dated Jun. 17, 2019.

* cited by examiner

NETWORK SOURCE IDENTIFICATION VIA AUDIO SIGNALS

BACKGROUND

A server can receive a request for information. The server can route the request for information to numerous databases or servers in order to obtain the requested information.

SUMMARY

The present technical solution is generally directed to network source identification via audio signals. For example, a data processing system in a voice-based computing environment can receive a request or search query. The data processing system can access various sources or databases to generate a response to the request. However, in the voice-based computing environment, it can be challenging to identify the source in an efficient manner. Thus, systems and methods of the present technical solution can improve the efficiency and effectiveness of information transmission and network source identification over one or more interfaces or one or more types of computer networks. For example, voice-based computing systems may have access to limited types of interfaces, or there may a limited number of available interfaces at a given time. It may be challenging for a system to efficiently transmit information to identify a source of the information in such a voice-based computing environment.

At least one aspect of the present technical solution is directed to a system to mix audio signals. The system can include a data processing system having one or more processors and memory. The data processing system can include a natural language processor component, a digital component selector component, and a synthesizer component. The data processing system can receive, via an interface of the data processing system and a network, data packets comprising an input audio signal detected by a sensor of a client device. The data processing system can parse the input audio signal to identify a request. The digital component selector component can receive the request identified by the natural language processor. The digital component selector component can select, responsive to the request, a digital component provided by a digital component provider device. The digital component provider device can have an identifier. The synthesizer component can identify a plurality of audio chimes stored in memory of the client device. The synthesizer component can match, based on a policy, the identifier of the digital component provider device to a first audio chime of the plurality of audio chimes stored in the memory of the client device. The synthesizer component can determine, based on a characteristic of the first audio chime, a configuration to combine the digital component with the first audio chime. The synthesizer component can generate an action data structure. The action data structure can include the digital component, an indication of the first audio chime, and the configuration. The synthesizer component can transmit, via the network, the action data structure to the client device to cause the client device to generate an output audio signal based on the action data structure. The output audio signal can include the digital component received via the digital component provider device and the first audio chime retrieved from the memory of the client device.

At least one aspect of the present technical solution is directed to a method of mixing audio signals. The method can be performed by a data processing system having one or more processors and memory. The method can include an interface of the data processing system receiving, via a network, data packets comprising an input audio signal detected by a sensor of a client device. The method can include the data processing system parsing the input audio signal to identify a request. The method can include the data processing system selecting, responsive to the request, a digital component provided by a digital component provider device. The digital component provider device can have an identifier. The method can include the data processing system identifying a plurality of audio chimes stored in memory of the client device. The method can include the data processing system matching, based on a policy, the identifier of the digital component provider device to a first audio chime of the plurality of audio chimes stored in the memory of the client device. The method can include the data processing system determining, based on a characteristic of the first audio chime, a configuration to combine the digital component with the first audio chime. The method can include the data processing system generating an action data structure comprising the digital component, an indication of the first audio chime, and the configuration. The method can include the data processing system transmitting, via the network, the action data structure to the client device to cause the client device to generate an output audio signal based on the action data structure. The output audio signal can include the digital component received via the digital component provider device and the first audio chime retrieved from the memory of the client device.

Aspects may include one or more of the following features. Identifying, prior to receipt of the input audio signal detected by the sensor of the client device, one or more audio chimes of the plurality of audio chimes; and transmitting the one or more audio chimes of the plurality of audio chimes to the client device for storage in the memory of the client device. Requesting, prior to receipt of the input audio signal detected by the sensor of the client device, a list of audio chimes stored in memory of the client device; and receiving, responsive to the request, the list of chimes comprising an identification of the plurality of audio chimes stored in memory of the client device. Determining, based on a plurality of historical requests received from the client device, a plurality of digital component provider devices associated with digital components responsive to the plurality of historical requests; identifying a second plurality of chimes corresponding to the plurality of digital component provider devices; and transmitting the second plurality of chimes to the client device for storage in the memory. Receiving, from the digital component provider device, a request to register audio chimes; approving, based on a data quality score of the digital component provider device, the request to register audio chimes for the digital component provider device; receiving, from the digital component provider device, the first chime; and transmitting, prior to receipt of the input audio signal detected by the sensor of the client device, the first audio chime to the client device for storage in the memory of the client device. Parsing a plurality of websites associated with digital component provider devices; identifying, from the plurality of websites, a second plurality of audio chimes; filtering, based on a memory reduction policy, the second plurality of audio chimes to remove one or more audio chimes from the second plurality of audio chimes to establish the plurality of audio chimes; and transmitting, to the client device, the plurality of audio chimes for storage in the memory of the client device. Accessing a website associated with the digital component provider device; identifying, via the website, a second plurality of audio chimes; ranking, based on a machine learning technique, the second plurality of audio chimes to assign the first audio chime a higher rank relative to a second audio chime of the second plurality of audio chimes; and transmitting, to the client device responsive to the rank, the first audio chime for storage in the memory of the client device. Accessing a website associated with the digital component provider device; identifying, via the website, a second plurality of audio chimes comprising the first audio chime and a second audio chime; determining that the first audio chime comprises spoken words; determining that the second audio chime is absent spoken words; assigning, based on the first audio chime comprising spoken words and the second audio chime absent spoken words, the first audio chime a higher rank relative to the second audio chime; and transmitting, to the client device responsive to the assignment, the first audio chime for storage in the memory of the client device. The characteristic of the first audio chime may indicate that spoken words are absent from the first audio chime. Determining, responsive to the characteristic of the first audio chime, the configuration comprising overlaying the first audio chime with at least a portion of the digital component. The characteristic of the first audio chime may indicate that the first audio chime includes spoken words. Determining, responsive to the characteristic of the first audio chime, the configuration comprising appending the first audio chime to the digital component in a non-overlapping manner before or after the digital component. Selecting, responsive to the request, a second digital component provided by a second digital component provider device having a second identifier; identifying a second chime corresponding to the second digital component provider device; determining, based on the characteristic of the first audio chime and a characteristic of the second audio chime, a second configuration to combine the digital component and the second digital component with the first audio chime and the second audio chime; generating the action data structure comprising the digital component, the second digital component, the indication of the first audio chime, an indication of the second audio chime, and the second configuration. Receiving a second request corresponding to a second client device; selecting, responsive to the second request, the digital component provided by the digital component provider device; identifying a second plurality of audio chimes stored in memory of the second client device; and matching, based on the policy, the identifier of the digital component provider device to a second audio chime of the second plurality of audio chimes stored in the memory of the second client device, the second audio chime different from the first audio chime.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of modulating packetized audio signals. The various concepts introduced above and discussed in greater detail below may be implemented in any of numerous ways.

The present technical solution is generally directed to network source identification via audio signals. For example, a data processing system in a voice-based computing environment can receive a request or search query. The data processing system can access various sources or databases to generate a response to the request. However, in the voice-based computing environment, it can be challenging to identify the source in an efficient manner. Thus, systems and methods of the present technical solution can improve the efficiency and effectiveness of information transmission and network source identification over one or more interfaces or one or more types of computer networks. For example, voice-based computing systems may have access to a limited number of interfaces, limited types of interfaces, or there may a limited number of available interfaces at a given time. It may be challenging for a system to efficiently transmit information and identify a source of the information using the currently available interfaces.

Systems and methods of the present technical solution can identify audio signals or audio chimes stored in memory of a client computing device. The data processing system can use the previously stored chimes in memory of the client computing device to provide an indication or identification for a source of information accessed via a remote server or remote database. Thus, rather than transmit the audio chime from the data processing system to the client device, the data processing system can provide a pointer or identifier to the client computing device of the audio chime to combine with the response to provide the network source identification. The audio chime can include spoken words, a modulation, a tone, a frequency, center frequency, and amplitude, a watermark, overlay, or otherwise audio signal that can indicate a source of data.

The present solution can reduce bandwidth utilization and associated latency in outputting a response by a speaker by selecting an audio chime previously stored in memory of the client device. By selecting a previously stored audio chime, the data processing system can reduce bandwidth utilization by transmitting smaller data files that do not include the audio chime, or reducing latency by reducing the amount of data transmitted.

Figure 1:
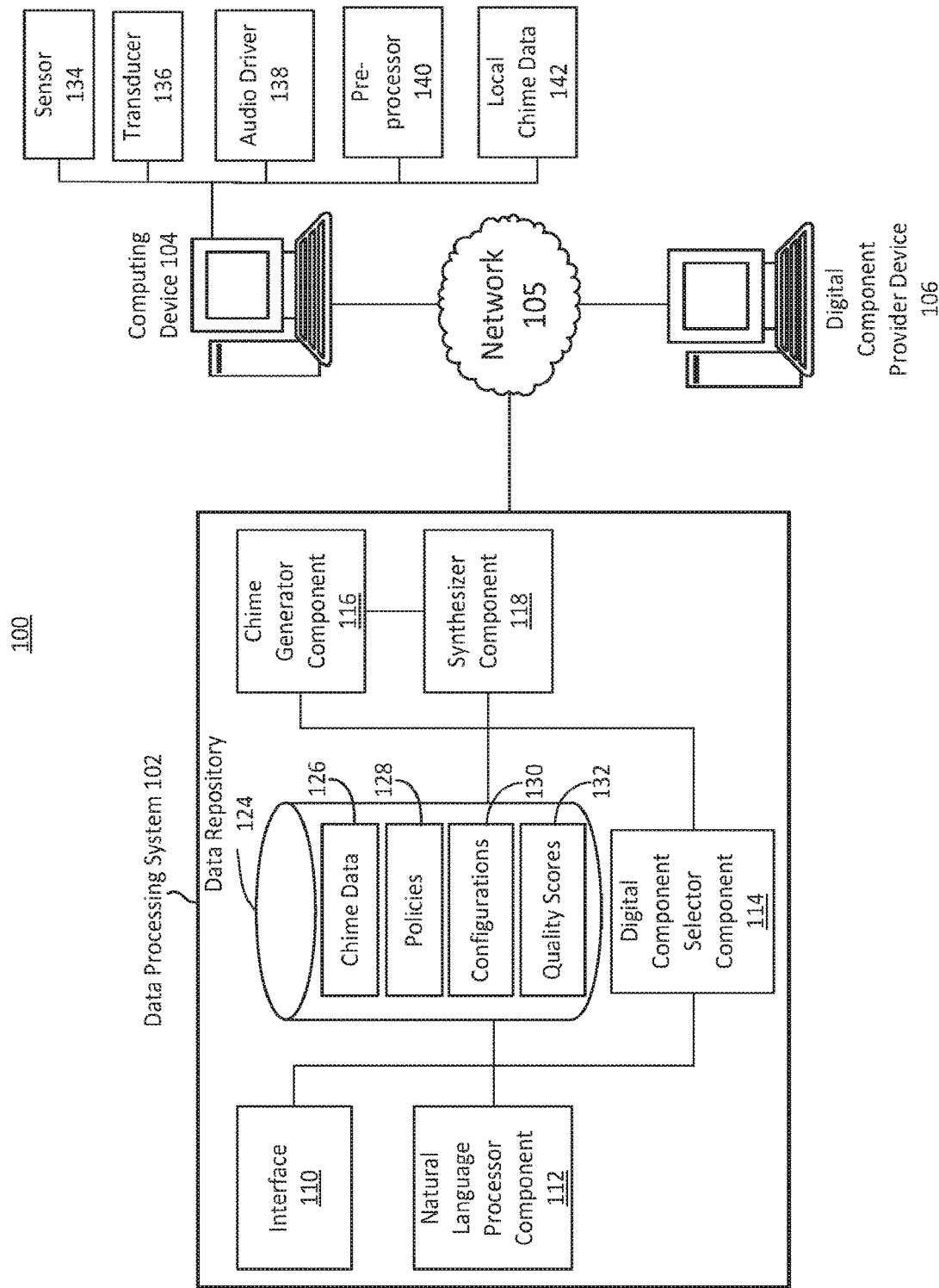
FIG. 1 is an illustration of a system to mix audio signals, in accordance with an implementation.

FIG. 1 illustrates an example system 100 for network source identification via audio signals. The system 100 can include content selection infrastructure. The system 100 can include a data processing system 102. The data processing system 102 can communicate with one or more of a digital component provider device 106 or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a digital component provider device 106. The computing device 104 may or may not include a display; for example, the computing device may include limited types of user interfaces, such as a microphone and speaker. In some cases, the primary user interface of the computing device 104 may be a microphone and speaker. The computing device 104 can interface with or be included in a voice-based computing environment.

The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the digital component provider device 106. The network 105 can include or constitute a sub-network of information resources available on the internet that are associated with a content placement or search engine results system, or that are eligible to include third party digital components as part of a digital component placement campaign.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, digital component provider device 106 (e.g., content provider). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one digital component provider device 106. The digital component provider device 106 can include at least one logic device such as a computing device having a processor to communicate via the network 105, for example with the computing device 104, or the data processing system 102. The digital component provider device 106 can include at least one computation resource, server, processor or memory. For example, the digital component provider device 106 can include a plurality of computation resources or servers located in at least one data center. The digital component provider device 106 can include one or more component or functionality of the data processing system 102. The digital component provider device 106 can include or refer to a service provider device, or goods provider device.

The digital component provider device 106 can provide audio based digital components for display by the client computing device 104 as an audio output digital component. The digital component can include responses to search queries or requests. The digital component can include information from databases, search engines, or networked resources. For example, the digital component can include news information, weather information, sports information, encyclopedia entries, dictionary entries, or information from digital textbooks. The digital component can include offers for a good or service, such as a voice based message that states: "Would you like me to order you a taxi?" The digital component provider device 106 can include memory to store a series of audio digital components that can be provided in response to a voice based query. The digital component provider device 106 can also provide audio based digital components (or other digital components) to the data processing system 102 where they can be stored in the data repository 124. The data processing system 102 can select the audio digital components and provide (or instruct the content provider computing device 104 to provide) the audio digital components to the client computing device 104. The audio based digital components can be exclusively audio or can be combined with text, image, or video data.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a trigger keyword, predetermined hot word, initiation keyword, or activation keyword. In some cases, the trigger keyword can include a request to perform an action. In some cases, the trigger keyword can include predetermined action keyword to enable or activate the computing device 104, and the request keywords can follow the trigger keyword or hot word. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer generated voice that can be provided from the data processing system 102 (or the digital component provider device 106) to the client computing device 104, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store chime data 126, policies 128, configuration 130, and quality score data 132, among other data. The chime data 126 can include or refer to a chime data base, chime data structure, or chime index. The chime data 126 can include or store audio chimes using an audio codec, such as .wav, .mp3, .wma, .alac, .flac, .aac, for example. The chime data 126 can include an index of audio chime identifiers that map to digital component provider device identifiers or other data source identifiers. The chime data 126 can include meta data about the chimes, such as a characteristic of the chime or type of the chime. A characteristic of the chime can refer to or include whether the chime includes spoken words, spoken words and music, spoken words only, or instrumental only. Additional characteristic of the chime can include, for example, a duration of the chime, a volume of the chime, frequency or tone of the chime. The characteristics can include or indicate a configuration for the chime, such as whether the chime is configured to be played before a digital component, after a digital component, during a digital component, or whether the chime can overlap with the digital component.

The data repository 124 can store policies 128 (e.g., a policy data structure). The policies 128 can be used by the data processing system 102 match identifiers of digital component providers to audio chimes. The data processing system 102 can use the policies to match identifiers to audio chimes stored on a computing device 104. Policies 128 can include or be based on, for example, rules, logic, thresholds, characteristics, or preferences.

The data repository 124 can include or store configurations 130 (e.g., a configuration data structure). Configurations 130 can refer to how the audio chime can be combined with the digital component. Example configurations can include adding the audio chime before the audio digital component, adding the audio chime after the digital component, or at least partially overlaying the audio chime over the digital component. Additional example configurations can include adjusting or modifying a characteristic of the audio chime or the audio digital component, such as an amplitude, volume, frequency, tone or duration.

The data repository 124 can include or store quality scores 132. Quality scores 132 can refer to a quality of a digital component provider device 106. For example, the quality scores 132 can indicate a quality in a source of information. The quality score 132 can indicate a quality of a website. Quality can refer to validity, reliability, popularity, trust, or security. The quality score can include a numeric value, an alphanumeric value, grade, or other indicator of score. The quality score can be binary (e.g., 0 or 1; good or bad; or pass or fail). The quality score can be on a scale, such as a scale of 1 to 10 (with 1 being the lowest quality and 10 being the highest quality, or vice versa), or grade A to F. For example, the quality of a digital component provider device 106 or website can be high (e.g., a 9 or 10) if the information on the website is corroborated by multiple other websites. The data processing system 102 can include a machine learning engine or process to determine the quality of a digital component provider device 106. The data processing system 102 can determine the quality of a website based on how often the website is updated (e.g., a news website that is updated daily). The data processing system 102 can include a predetermined list of websites with quality scores. The data processing system 102 can determine the quality of a website based on feedback, by parsing comments, or using other techniques. In some cases, a user of the computing device 104 can provide a score of websites that they prefer.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one digital component selector component 114. The data processing system 102 can include, interface, or otherwise communicate with at least one chime generator component 116. The data processing system 102 can include, interface, or otherwise communicate with at least one synthesizer component 118. The data processing system 102 can include, interface, or otherwise communicate with at least one data repository 124. The at least one data repository 124 can include or store, in one or more data structures or databases, chime data 126, policies 128, configurations 130, or quality scores 132.

The interface 110, natural language processor component 112, digital component selector component 114, chime generator component 116, or synthesizer component 118 can each include at least one processing unit or other logic device such as programmable logic array engine, or module configured to communicate with the database repository or database 124. The interface 110, natural language processor component 112, digital component selector component 114, chime generator component 116, synthesizer component 118 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A digital component provider 106 can establish an electronic content campaign. The electronic content campaign can be stored as content data in data repository 124. An electronic content campaign can refer to one or more content groups that correspond to a common theme. A content campaign can include a hierarchical data structure that includes content groups, digital component data objects, and content selection criteria. To create a content campaign, digital component provider 106 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or digital component provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object is at least partially (e.g., 20%, 30%, 30%, 40%, 50%, 60%, 70%, or more) viewable on a display device of the client computing device 104, or audible via a speaker 136 of the computing device 104. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The digital component provider 106 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the digital component provider 106 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The digital component provider 106 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The digital component provider 106 can provide one or more keywords to be used by the data processing system 102 to select a digital component object provided by the digital component provider 106. The digital component provider 106 can identify one or more keywords to bid on, and further provide bid amounts for various keywords. The digital component provider 106 can provide additional content selection criteria to be used by the data processing system 102 to select digital component objects. Multiple content providers 106 can bid on the same or different keywords, and the data processing system 102 can run a content selection process or ad auction responsive to receiving an indication of a keyword of an electronic message.

The digital component provider 106 can provide one or more digital component objects for selection by the data processing system 102. The data processing system 102 (e.g., via digital component selector component 114) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the data processing system 102 can transmit the digital component object for rendering on a computing device 104 or display device of the computing device 104. Rendering can include displaying the digital component on a display device, or playing the digital component via a speaker of the computing device 104. The data processing system 102 can provide instructions to a computing device 104 to render the digital component object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an app to communicate input audio signals to the interface 110 of the data processing system 102 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can identify search queries or trigger phrases corresponding to performing a search or other request for information. The NLP component 112 can determine that the input audio signal corresponds to a request for information about a topic, event, current event, news event, dictionary definition, historical event, person, place or thing. For example, the NLP component 112 can determine that the input audio signal corresponds to a search query for information about a historical event, such as "When did the American Revolution take place?"

The NLP component 112 can filter the input audio signal to identify the keywords, search query, or trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include multiple request for information such as "When was the American Revolution and what years did George Washington serve as President?" The NLP component 112 can determine that this request includes two different queries that the responses to the queries may come from two different sources. In another example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a digital component provider device 106. In some cases, the NLP component 112 can transmit the individual requests to respective service provider devices 108, or separately transmit both requests to the digital component provider device 106.

The data processing system 102 can include, execute, or otherwise communicate with a digital component selector component 114 to receive the queries, keywords or trigger keyword identified by the natural language processor and select, based on the trigger keyword, a digital component. The digital component selector component 114 can select the digital component via a real-time content selection process. The content selection process can include, for example, performing a search via a search engine, or accessing a database stored on a remote server or device such as a digital component provider device 106. The content selection process can refer to, or include, selecting sponsored digital component objects provided by third party content providers 106. The real-time content selection process can include a service in which digital components provided by multiple content providers are parsed, processed, weighted, or matched in order to select one or more digital components to provide to the computing device 104. The digital component selector component 114 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 1 second, 2 seconds, 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated. The data processing system 102 can select an audio chime to provide subsequent to completion of the digital component selection process or other digital task.

For example, the data processing system 102 can include a digital component selector component 114 designed, constructed, configured or operational to select digital component objects. To select digital components for display in a voice-based environment, the data processing system 102 (e.g., via NLP component 112) can parse the input audio signal to identify queries, keywords (e.g., a trigger keyword), and use the keywords to select a matching digital component. The data processing system 102 can select the matching digital component based on a broad match, exact match, or phrase match. For example, the digital component selector component 114 can analyze, parse, or otherwise process subject matter of candidate digital components to determine whether the subject matter of the candidate digital components correspond to the subject matter of the keywords or phrases of the input audio signal detected by the microphone of the client computing device 104. The digital component selector component 114 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the digital component selector component 114 may process the metadata to determine whether the subject matter of the candidate digital component corresponds to the input audio signal.

Digital component providers 106 may provide additional indicators when setting up a content campaign that includes digital components. The content provider may provide information at the content campaign or content group level that the digital component selector component 114 may identify by performing a lookup using information about the candidate digital component. For example, the candidate digital component may include a unique identifier, which may map to a content group, content campaign, or content provider. The digital component selector component 114 may determine, based on information stored in content campaign data structure in data repository 124, information about the digital component provider 106.

The data processing system 102 can receive, via a computer network, a request for content for presentation on a computing device 104. The data processing system 102 can identify the request by processing an input audio signal detected by a microphone of the client computing device 104. The request can include selection criteria of the request, such as the device type, location, and a keyword associated with the request.

Responsive to the request, the data processing system 102 can select a digital component object from data repository 124 or a database associated with the digital component provider 106, and provide the digital component for presentation via the computing device 104 via network 105. The computing device 104 can interact with the digital component object. The computing device 104 can receive an audio response to the digital component. The computing device 104 can receive an indication to select a hyperlink or other button associated with the digital component object that causes or allows the computing device 104 to identify a service provider, request a service from the service provider, instruct the service provider to perform a service, transmit information to the service provider, or otherwise query the service provider device.

However, in a voice-based computing environment in which the input is an audio signal provided and the output can also be an audio signal, it can be challenging, cumbersome or inefficient to accurately identify the digital source that provided the response to the request, query or keyword. For example, the response to the query "When did the American revolution take place?" may be a first digital component provider device 106, whereas the response to the query "What is the weather?" can be from a second digital component provider device 106. Since a display device may not be accessible or coupled to the computing device 104 (e.g., the computing device 104 can be a speaker configured with a digital assistant), the data processing system 102 may not be able to provide a logo, or other visual indication of the source. Further, the data processing system 102 may determine that providing a text to speech version of the source, such as "first digital computing device" may be inefficient or result in an output signal that has a longer duration. Thus, the data processing system 102 can determine to use an audio chime that is an indicator of the source of the digital component selected responsive to the request in the input audio signal.

Providing an audio chime that indicates the source of the digital component may utilize additional bandwidth. Further, since the same or similar sources may be used to provide responses to queries from the input audio signals (e.g., an online encyclopedia, an online weather database, an online dictionary, or an online news website), the data processing system 102 can determine to reduce bandwidth consumption by storing frequently used audio chimes on the computing device 104 as chime data 142.

The data processing system 102 can include a chime generator component 116 designed, constructed, configured or operational to generate, identify or store audio chimes. The chime generator component 116 can register and store chimes provided by a digital component provider device 106. The chime generator component 116 can provide an interface (e.g., via interface 110) via which digital component provider devices 106 can upload or transmit audio chimes. The digital component provider device 106 can transmit an audio chime configured using an audio codec. The chime generator component 116 can process or receive audio chimes in various formats or audio codec and convert the audio chime into a common format for storage in the data repository 124 chime data 126 or for provision to the computing device 104 for storage in chime data 142 on the computing device (e.g., computing device chime data). The data processing system 102 can receive one or more audio chimes from the same digital component provider device 106. The data processing system 102 can receive information associated with the audio chimes, such as an identifier of the digital component provider device 106, or information about a policy to use to select the audio chime. The data processing system 102 can store the received audio chime in the chime data 126 and assign the audio chime an identifier corresponding to the digital component provider device 106 or online source.

For example, the data processing system 102 can receive, from the digital component provider device 106, a request to register audio chimes. The data processing system 102 can approve, based on a data quality score of the digital component provider device 106, the request to register audio chimes for the digital component provider device 106. The quality score can indicate whether the digital component provider device 106 is trusted, safe, secure, provides reliable information, or is otherwise authorized or approved for audio chimes. The data processing system 102 can receive, from the digital component provider device, the audio chime. The data processing system 102 can assess the quality score of the data processing system 102 responsive to a request to register the audio chime. The data processing system 102 can determine the quality score for the digital component provider device 106 by performing a lookup in the quality scores 132 data structure stored in data repository 124 using the identifier for the digital component provider device 106. The data processing system 102 can determine to block registration of the audio chime if the quality score is less than a threshold quality score. The data processing system 102 can determine to store the audio chime in chime data 126, but block the use or transmission of the audio chime responsive to the quality score being below a threshold. The data processing system 102 can dynamically determine the quality score for a provider, and then make a real-time decision as to whether to include the audio chime with the digital component at the time of generation of the data structure or output audio signal.

The data processing system 102 (e.g., via chime generator component 116) can process a website or multimedia content of a digital component provider device 106 or online source to identify an audio chime. For example, the chime generator 116 can be configured with one or more machine learning techniques to parse, process or otherwise analyze a website or multimedia content to automatically identify an audio chime corresponding to the source of the information. For example, a website can include multiple links to video content or audio content. Each of the video or audio content items can include a portion with the same audio. Thus, the data processing system 102 can determine that the portions with the same audio can correspond to an audio chime that can be used as an identifier of the source of the information. The data processing system 102 can determine to store the audio chime in the chime data 126 and assign the audio chime with an identifier corresponding to the source.

The data processing system 102 can apply natural language processing techniques to determine spoken words in video or audio content. The data processing system 102 can determine that the spoken words can identify the source of the information and form an audio chime. For example, the same spoken words can be used on multiple video or audio content items associated with a website, and the data processing system 102 can determine to create an audio chime that includes the spoken words. The audio chime with the spoken words can identify the source.

The chime generator component 116 can determine that a website associated with a digital component provider device 106 or other source includes a data file that is tagged as an audio chime for the website. For example, the developer of the website can store a data file with a tag that identifies the data file as an audio chime. The tag can be a predetermined tag or in a predetermined format. The chime generator 116 can crawl websites to identify websites having audio chime tags, retrieve the audio chimes, assign the audio chime an identifier, and store the audio chime in chime data 126 or provide the audio chime for storage in chime data 142 on the computing device 104.

The data processing system 102 can receive chimes from a user of the computing device 104. For example, the user of the computing device 104 can select their own audio chimes to present with digital component from particular sources or providers. The user can select a list of available audio chimes, or provide audio chimes from other sources. The user can assign the audio chimes to digital component providers, or the data processing system 102 can match the user provided audio chimes to providers based on a policy or characteristic of the audio chime.

The data processing system 102 (e.g., via chime generator 116) can process the audio chimes to identify or determine characteristics associated with the audio chimes. The data processing system 102 can use natural language processing techniques to determine if the audio chimes include spoken words. The data processing system 102 can determine whether the audio chimes are instrumental only. The data processing system 102 can determine whether the audio chimes include music. The data processing system 102 can determine whether the audio chimes include certain types of words, such as trademarked terms, nouns, or verbs. The data processing system 102 can determine a duration of the audio chime, a volume of the audio chime, or frequency or tone of the audio chime.

The data processing system 102 can rank or score audio chimes. For example, a digital component provider 106 can be associated with multiple chimes. The different audio chimes can include different characteristics. The data processing system 102 can rank the audio chimes for a digital component provider device 106 based on the characteristics. For example, a shorter duration audio chime can be ranked higher than a longer duration audio chime; an audio chime with spoken words can be ranked higher than an audio chime without spoken words; an audio chime with a high tone can be ranked lower than an audio chime with a low tone. The ranking can be based on a machine learning technique, feedback, or preferences. The ranking can be based on types of digital component providers or digital component.

For example, the data processing system 102 can determine the rank for an audio chime for a dictionary source by ranking characteristics such as short duration higher than long duration because a digital component from a dictionary may have a short duration. The data processing system 102 can determine the rank for an audio chime for a news source by ranking characteristics such as long duration higher than short duration because a digital component from a news source may have a longer duration. The data processing system 102 can determine the rank for an audio chime for a news source by ranking characteristics such as spoken words higher than instrumental only.

For example, the data processing system 102 can access a website associated with digital component provider device 106. The data processing system 102 can identify, via the website, multiple audio chimes. The data processing system 102 can rank, based on a machine learning technique, the audio chimes to assign a first audio chime a higher rank relative to a second audio chime of the multiple audio chimes identified on the website. The data processing system 102 can transmit, to the computing device 104 responsive to the rank, the first audio chime for storage in the local chime data 142 memory of the computing device 104 (e.g., client device).

In another example, the data processing system 102 can access a website associated with digital component provider device 106. The data processing system 102 can identify, via the website, the audio chimes including a first audio chime and a second audio chime. The data processing system 102 can determine that the first audio chime includes spoken words, and the second audio chime is absent spoken words (e.g., instrumental only). The data processing system 102 can assign, based on the first audio chime comprising spoken words and the second audio chime absent spoken words, the first audio chime a higher rank relative to the second audio chime. The data processing system 102 can transmit, to the computing device 104 responsive to the assignment, the first audio chime for storage in the local chime data 142 memory of the computing device 104.

The data processing system 102 (e.g., via chime generator component 116) can map chimes to identifiers corresponding to the digital component provider device 106 or information source. The data processing system 102 can store the mapping of audio chimes to identifiers in chime data 126. The data processing system 102 can store characteristics associated with audio chimers in the chime data 126. The data processing system 102 can store the identifiers, characteristics, and audio chime in a data structure or using an index that includes pointers to the audio chime data file.

The data processing system 102 can provide audio chimes to the computing device 104. The data processing system 102 can transmit the local chime data 142 based on a time interval, such as every 24 hours, 48 hours, 72 hours, weekly, monthly, or other time interval. The data processing system 102 can update the local chime data 142 responsive to an event, condition or request. The data processing system 102 can perform a batch transfer of the local chime data 142. The data processing system 102 can transmit, prior to receipt of the input audio signal detected by the sensor 134 of the computing device 104, the audio chime to the computing device 104 (e.g., client device) for storage in the local chime data 142 memory of the computing device 104.

The data processing system 102 can transmit audio chimes or chime data to the computing device 104. The data processing system 102 can transmit all of chime data 126 or a subset of chime data 126 to the computing device 104 for storage as local chime data 142 in memory of the computing device 104. For example, the data processing system 102 can determine frequently used sources by the computing device 104 and then select a subset of chime data 126 for storage as local chime data 142. The local chime data 142 can be a limited or fixed size or number of audio chimes so as not to occupy excessive memory resources on the computing device 104.

The data processing system 102 can determine, based on historical requests received from the computing device 104, multiple digital component provider devices associated with digital components responsive to the historical requests. The data processing system 102 can identify a set of chimes corresponding to the digital component provider devices, and then transmit the set of chimes to the computing device 104 for storage in the memory as local chime data 142. The historical requests can refer to requests within the past 24 hours, 48 hours, 72 hours, week, month or other time interval. The data processing system 102 can maintain a list of identifiers of providers corresponding to the requests, and maintain a counter of the number of requests associated with each provider in order to rank the most frequent providers. The data processing system 102 can provide chime data for all providers associated with requests in the past 24 hours, 48 hours, 72 hours, week, month or other interval. The data processing system 102 can provide chime data for the top N number of providers (e.g., top 5, top 10, or other number).

The data processing system 102 can identify multiple websites or online databases associates with digital component provider devices 106. To reduce memory utilization on the computing device 104, rather than provide all available audio chimes, the chime generator component 116 can filter out the multiple audio chimes to select a subset of audio chimes or a single audio chime to provide for a source or digital component provider device 106. For example, the data processing system 102 can use a memory reduction policy (e.g., stored in policies 128) to filter out audio chimes and select the audio chime to transmit to the computing device 104 for storage in local chime data 142. The memory reduction policy can include, for example, selecting the audio chime having the smallest data file size, selecting the audio chime with the least duration, or the determination to remove one or more audio chimes that may be redundant or duplicative because they identify the same provider.

The data processing system 102 filter, based on the memory reduction policy, the audio chimes to remove one or more audio chimes to establish a filtered set or final set of audio chimes (e.g., chime data 126). The data processing system 102 can transmit some or all of the audio chimes from the final set of audio chimes to the computing device 104 for storage in the local chime data 142 memory of the client computing device 104.

The data processing system 102 can provide the audio chimes for storage in the local chime data 142. For example, the data processing system 102 can provide the audio chimes to the computing device 104 for storage before receiving the input audio signal that resulted in the selection of the digital component. In some cases, the data processing system 102 can receive a request for audio chimes from the computing device 104.

The computing device 104 can store one or more sets of chime data in the local chime data 142. For example, the computing device 104 can use a first set of chime data for a first user, and a second set of chime data for a second user of the computing device 104. The data processing system 102 can use one or more policies to select a chime to use for a digital component based on the user of the computing device 104. For example, the data processing system 102 or computing device 104 can use a user-specific matching policy to select a chime to assign to a digital component. In some cases, the data processing system 102 or computing device 104 can select the user based on an account or profile that has been logged into the computing device 104 or data processing system 102.

The data processing system 102 can include a synthesizer component 118. The synthesizer component 118 can be designed, constructed, configured or operational to provide an audio chime with a digital component. The data processing system 102 (e.g., via synthesizer component 118) can identify audio chimes stored in memory of the computing device 104. The data processing system 104 can request a list of audio chimes in local chime data 142. For example, the data processing system 104 can request the list of audio chimes responsive to the input audio signal being received. The computing device 104 can provide the list of audio chimes stored in local chime data 142 along with the input audio signal. The data processing system 104 can maintain, in the data repository 124, a list of audio chimes stored in the data of local chime data 142 of a computing device 104. The data processing system 102 can select the audio chime to use based on the list of available audio chimes stored in local chime data 142. In some cases, the data processing system 102 can transmit the audio chime to the computing device 104. In some cases, the data processing system 102 can determine to select the audio chime to use from the list of available audio chimes in the local chime data 142 to reduce the bandwidth utilization and latency associated with the providing the audio chime along with the digital component.

The data processing system 102 can request, prior to receipt of the input audio signal, a list of audio chimes stored in memory of the computing device 104. The data processing system 102 can receive, responsive to the request, the list of chimes comprising an identification of the audio chimes stored in the local chime data 142 memory of the computing device 104.

The data processing system 102 can match, based on a policy (e.g., from policies 128), the identifier of the digital component provider device 106 to a first audio chime of the audio chimes stored in the local chime data 142 memory of the computing device 104. The policy can be a one-to-one matching of the identifier to the audio chimes associated with the same identifier. If an identifier is associated with multiple audio chimes, the data processing system 102 can use the policy to select the highest ranking audio chime for the identifier.

The policy can be to select the audio chime based on a characteristic of the audio chime or the digital component, such as duration, volume, tone, spoken words, or instrumental only. For example, the data processing system 102 can determine to keep the overall duration of the output to within a predetermine time limit (e.g., 30 seconds). The data processing system 102 can determine that the digital component duration is 25 seconds. The data processing system 102 can then select an audio chime associated with the identifier that is 5 seconds or less. In another example, if the duration of the digital component is 28 seconds, the data processing system 102 can select an audio chime for the identifier that is 2 seconds. In another example, if the duration of the digital component is 30 seconds, the data processing system 102 can select an audio chime that is configured for overlay or overlapping with the digital component (e.g., an instrumental only audio chime instead of a spoken words audio chime).

The data processing system 102 can determine, based on a characteristic of the audio chime, a configuration to combine the digital component with the first audio chime. The configuration can be selected from configuration 130 stored in data repository 124. The configuration can include, for example, adding the audio chime before the digital component, during the digital component, in the middle of the digital component, after the digital component, or overlapping or overlaying the audio chime over the digital component.

The data processing system 102 can determine the configuration based on a characteristic of the digital component or the audio chime, or both. For example, the configuration can be to minimize a duration of the output, in which case the data processing system 102 can determine to overlay the audio chime with the digital component. The data processing system 102 can determine that an overlay is possible if the audio chime is instrumental only. However, if the audio chime includes spoken words, the data processing system 102 can determine that an overlay is not possible. The data processing system 102 can then determine to add the audio chime after the digital component.

The data processing system 102 can determine the configuration to use to combine the chime with the digital component so as to improve, manage, or optimize intelligibility. For example, if an instrumental chime contains audio within a first frequency range, and the digital component also contains audio in the first frequency range, then the data processing system 102 can determine to select a configuration in which the chime is appended to the digital component before or after the digital component so as to prevent reducing the intelligibility of the digital component itself. In another example, if the answer to a query is a spoken-word, the data processing system 102 can avoid overlaying the answer with chimes where a component (e.g., a primary component) of the chime significantly overlaps the spoken word component. The data processing system 102 can use a Fast Fourier transform (FFT) technique and machine learning to determine if there is a collision between the chime and the answer. The data processing system 102 can detect a collision based on a comparison of an amplitude of the audio chime with an amplitude of the audio digital component containing the answer. The data processing system 102 can determine that if the difference in amplitude of one or more frequencies or frequency ranges is less than a threshold (e.g., 20 decibels, 15 decibels, 12 decibels, 10 decibels, 8 decibels, 5 decibels, or less), then the audio chime may cause the audio digital component or answer to be unintelligible, thereby resulting in a collision. The frequencies or frequency ranges can correspond to a frequency range of spoken words in the audio digital component or the audio chime, such as between 300-3000 Hz (or 300-4000 Hz, or 300-5000 Hz), for example. The data processing system can determine that any chime can be overlaid on an audio digital component if the chime is at least a threshold dB softer than the audio digital component or the spoken words of the audio digital component, especially in the frequency ranges where they overlap.

If the data processing system 102 determines that there may be a collision between the audio chime and the answer (e.g., in the spoken word frequency range of 300-3000 Hz of less than 12 dB), then the data processing system 102 can use one or more techniques to avoid the collision. For example, the data processing system 102 can select a different audio chime that is available on the local computing device that might also indicate the source of the answer. The data processing system 102 can set a configuration to combine the audio chime with the audio digital component that includes adjusting or manipulating the audio chime or the audio digital component containing the answer. For example, the data processing system 102 can set the configuration to include increasing an amplitude or decibel of one or more frequencies of the audio digital component or answer, and/or decrease an amplitude or decibel of one or more frequencies of the audio chime. The data processing system 102 can set the configuration to combine the audio chime with the audio digital component in a non-overlapping manner.

In another example, if an instrumental chime contains audio within a first frequency range, a spoken words chime contains audio in a second frequency range, and the digital component also contains audio in the first frequency range, then the data processing system 102 can determine to select the spoken words audio chime since it contains audio in the second frequency range that does not overlap (or substantially overlap, such as less than 10% overlap, 20% overlap, 30% overlap, 40% overlap, or 50% overlap) with the first frequency range. For example, the data processing system 102 can determine that the intelligible portion of the digital component contains audio in the frequency range of 1 KHz to 2 KHz.

For example, the characteristic of the audio chime can indicate that spoken words are absent from the audio chime. The data processing system 102, based on the indication that spoken words are absent, determine the configuration as overlaying the audio chime with at least a portion of the digital component. In another example, the characteristic of the audio chime can indicate that the audio chime includes spoken words. The data processing system 102 can determine, responsive to the characteristic of the audio chime indicating spoken words, the configuration as appending the first audio chime to the digital component in a non-overlapping manner before or after the digital component.

The data processing system 102 can determine to add the audio chime before or after the digital component based on a topic or keyword associated with the request or digital component. For example, for a news digital component, the data processing system 102 can determine to provide the audio chime before the digital component because the source may be of greater importance or relevance to the content of the digital component. For example, for a food recipe related digital component, the data processing system 102 can determine to set the configuration to provide the audio chime after the digital component (e.g., the ingredients for the recipe) because the source of information may be less critical.

The data processing system 102 (e.g., via the synthesizer component 118) can generate an action data structure. The action data structure can include the digital component provided by the digital component provider device 106, an indication of the audio chime selected for the digital component, and the configuration. The indication of the audio chime can include, for example, a pointer, identifier, file name, or other indication of the audio chime. For example, the action data structure can include a first field for the digital component, a second field for the indication of the audio chime to use, and a third field for the configuration of the audio chime with the digital component.

The data processing system 102 can transmit, via the network, the action data structure to the computing device 104. The data processing system 102 can cause the computing device 104 to generate an output audio signal based on the action data structure. The output audio signal can include the digital component received via the digital component provider device and the first audio chime retrieved from the local chime data 142 memory of the computing device 104. Thus, the computing device 104 can construct the output signal (e.g., via audio driver 138) and play the output signal via a speaker such as transducer 136.

The computing device 104 can perform a lookup in local chime data 142 to retrieve the audio chime selected by the data processing system 102. In some cases, the data processing system 102 can provide an identifier of the source, and the computing device 104 can select the corresponding audio chime from local chime data 142.

The data processing system 102 can select multiple digital components responsive to a single request or single input audio signal For example, the single input audio signal can include multiple queries, such as "What was the weather the day of the baseball championship game last year?" The data processing system 102 can select, responsive to the request, multiple digital components provided by multiple different digital component provider devices. Each digital component provider device can be associated with their own identifier (e.g., an alphanumeric identifier, account identifier, brand name, entity name, or organization name). The data processing system 102 can identify and select different audio chimes for each digital component provided by each digital component provider. The data processing system 102 can determine, based on characteristics of each of the audio chimes, a configuration to combine each of the digital components and each of the audio chimes. The data processing system 102 can generate an action data structure with each of the digital components, indications of each of the audio chimes, and the configuration.

The configuration can include, for example, adding each audio chime before the corresponding digital component. The configuration can include adding one audio chime before the first digital component, and adding the second audio chime after the second digital component. The configuration can include overlapping or overlaying one or both audio chimers over one or more both digital components. The data processing system 102 can determine the configuration based on a policy used to determine the configuration for a single digital component. The data processing system 102 can use a multiple digital component policy to determine the configuration when there are multiple digital components and multiple audio chimes. For example, the data processing system 102 can use a higher duration limit for the output audio signal for multiple digital components as compared to the duration limit that can be used for a single digital component (e.g., 1 minute versus 30 seconds). Based on the higher duration limit, the data processing system 102 can determine to add the audio chimes in a non-overlapping manner depending on the duration of the digital components themselves.

The data processing system 102 can receive multiple requests in different input audio signals. The data processing system 102 can receive requests from multiple computing devices 104 that are associated or linked with one another, or not associated or not linked with one another. For example, the data processing system 102 can receive a first request corresponding to a first client device. The data processing system 102 can receive a second request corresponding to a second client device different from the first computing device. The data processing system 102 can select the same digital component responsive to the first request and the second request. However, the data processing system 102 can determine that a first list of chimes stored in local chime data 142 for the first computing device is different from a second list of chimes stored in local chime data 142 for the second computing device. The data processing system 102 can match, based on the policy, the identifier of the digital component provider device to a second audio chime of the second list of audio chimes stored in the memory of the second client device, where the second audio chime can be different from the first audio chime.

Thus, the present technical solution can reduce resource consumption, processor utilization, battery consumption, bandwidth utilization, size of an audio file, or amount of time consumed by a speaker. For example, a network or data request can traverse various routes through a complex network infrastructure, thereby increasing the difficulty to determine the source of the information. Further, it may be challenging for a system to efficiently transmit information and identify a source of the information using the limited available interfaces of a voice-based computing device because certain types of interfaces may consume greater computing resources or battery. By selecting an audio chime previously stored in memory of the client device, the present technical solution can reduce resource consumption, processor utilization, battery consumption, bandwidth utilization, size of an audio file, or amount of time consumed by a speaker, while also providing the indication of the source via the audio chime.

Figure 2:
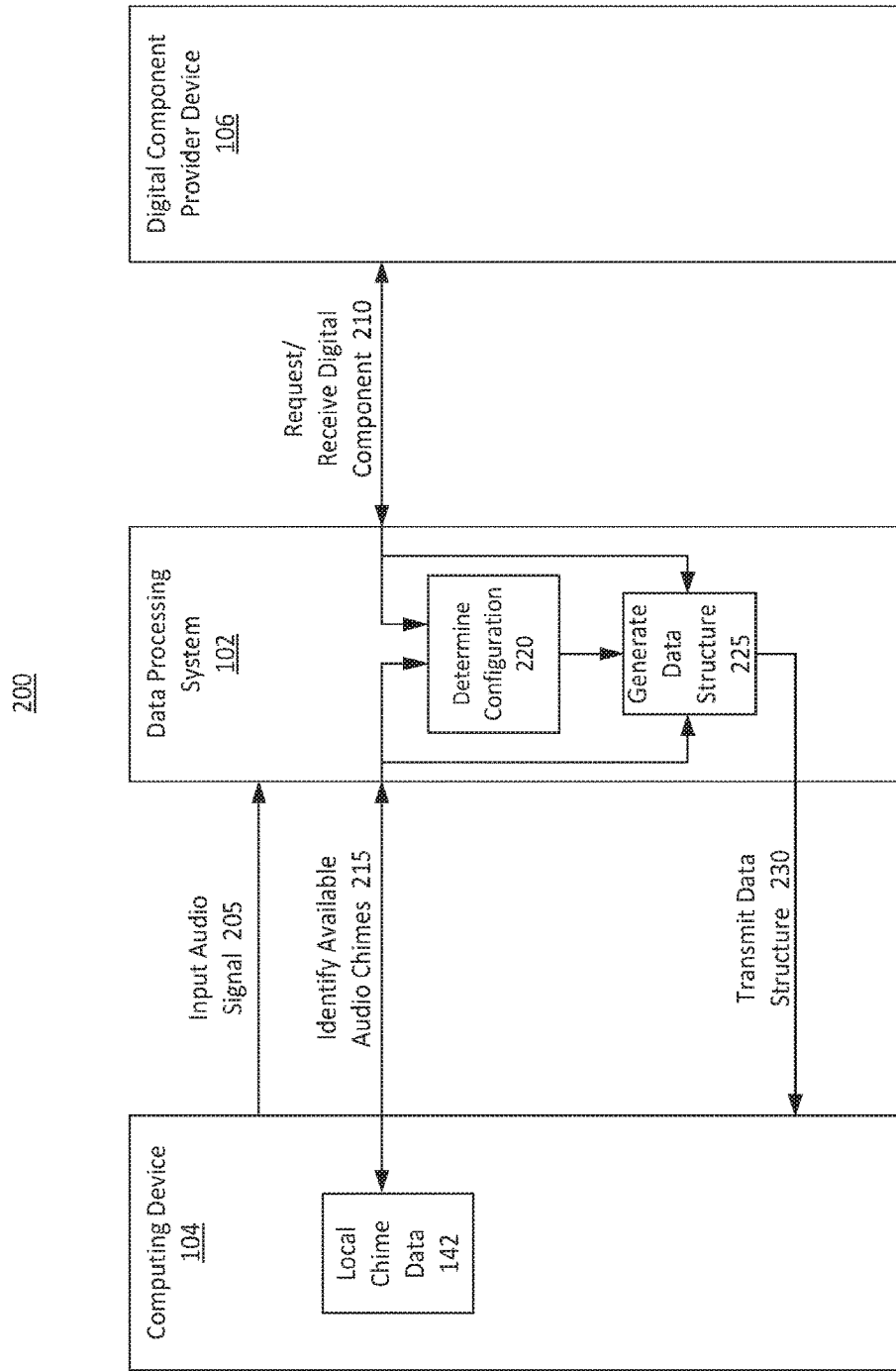
FIG. 2 is an illustration of an operation of a system to mix audio signals, in accordance with an implementation.

FIG. 2 is an illustration of an operation 200 of the system 100 to provide network source identification via audio signals. The system can include one or more component of system 100 depicted in FIG. 1. In the operation 200, at 205, the client computing device 104 can transmit data packets carrying the input audio signal detected by a microphone or other sensor of the computing device 104. The input audio signal can include keywords, trigger keywords, or phrases.

The computing device 104 can transmit the input audio signal 205 responsive to detection of a hot word or action word in a user voice input.

At 210, the data processing system 102 can request a digital component responsive to a query or request in the input audios signal 205. The data processing system 102 can query one or more digital component provider devices 106 to obtain the response or digital component. The data processing system 102 can receive the digital component from the digital component provider device 106.

At 215, the data processing system 102 can identify available audio chimes based on the list of chimes stored in local chime data 142. The data processing system 102 may have previously obtained an indication of the list of chimes. The data processing system 102 can obtain the indication of the list of chimes stored in local chime data 142 in parallel with searching or selecting the digital component. By determine the list of available chimes in parallel or in an overlapping manner (instead of serially) with searching for the digital component, the data processing system 102 can reduce latency.

At 220, the data processing system 102 can determine a configuration for the audio chime with the digital component based on one or more policies. For example, the data processing system 102 can determine to overlay the audio chime over the beginning portion of the digital component. At 225, the data processing system 102 can generate an action data structure with the digital component, indication of the audio chime, and an indication of the configuration. The data processing system 102 can transmit the action data structure at 230 to the computing device 104, which can play, render, present or otherwise execute the action data structure.

Figure 3:
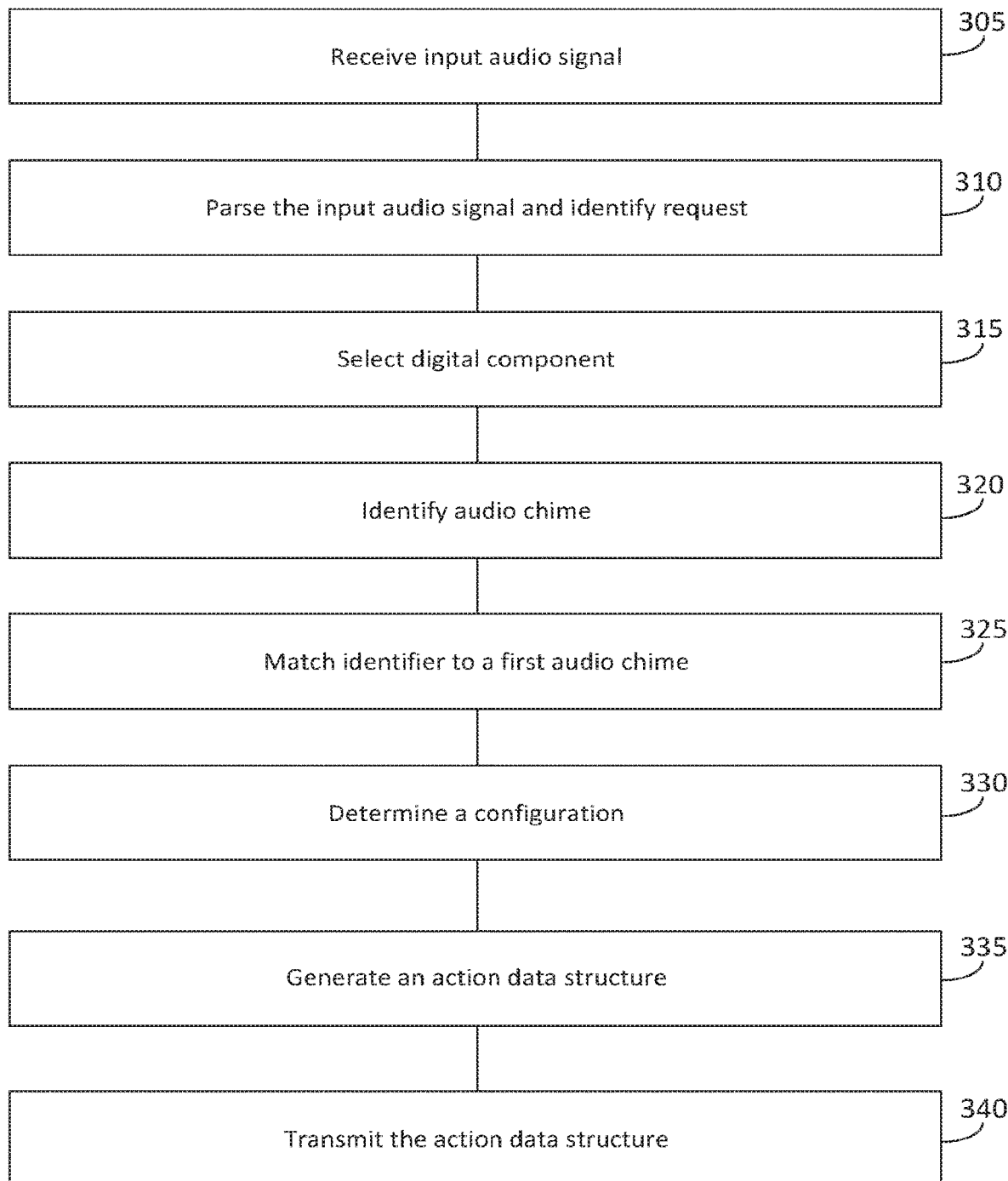
FIG. 3 is an illustration of a method of mixing audio signals, in accordance with an implementation.

FIG. 3 is an illustration of an example method for providing network source identification via audio signals. The method 300 can be performed by one or more component, system or element of system 100 or system 400. The method 300 can include receiving an input audio signal at 305. The input audio signal can be received via an interface of a data processing system. The input audio signal can be received via a network. The input audio signal can include or be in the form of data packets. The data packets can include the input audio signal. The input audio signal can be detected by a microphone of a client computing device.

At 310, the method 300 can include parsing the input audio signal and identifying the request. The data processing system can use one or more NLP processing techniques or machine learning techniques to recognize or identify a query, keyword or other request in the input audio signal. At 315, the method 300 can include selecting a digital component. The data processing system can select, responsive to the request, a digital component provided by a digital component provider device. The digital component provider device can have an identifier, such as a name, alphanumeric identifier, username, account identifier, or other identifier. The digital component provider device can be remote from the data processing system. The data processing system can select the digital component using a search index, web crawl, selection process, or a lookup in a database.

At 320, the method 300 can include identifying an audio chime. The data processing system can identify available audio chimes stored in memory of the client device. Available audio chimes can refer to audio chimes that are previously downloaded onto the client device. Previously can refer to before the input signal or request was received by the data processing system. The data processing system can query the client device for the list of audio chimes stored on the device. The data processing system may have previously (e.g., prior to the current request) queried the client device and stored the list of available chimes in a data repository of the data processing system.

At 325, the method 300 can include matching an identifier to a first audio chime. The data processing system can match, based on a policy, the identifier of the digital component provider device to a first audio chime of the plurality of audio chimes stored in the memory of the client device. The policy can include matching an identifier assigned to an audio chimes with the identifier of the digital component provider. The policy can include selecting a higher ranked audio chimes for the digital component provider.

At 330, the method 300 can include determining a configuration. The data processing system can determine, based on a characteristic of the first audio chime, a configuration to combine the digital component with the first audio chime. For example, the data processing system can determine to overlay the audio chime with the digital component if the audio chime is instrumental only and would not detract or obfuscate the digital component.

At 335, the method 300 can include generating an action data structure. The data processing system can generate an action data structure including the digital component, an indication of the first audio chime, and the configuration. At 340, the method 300 can include transmitting the action data structure. The data processing system can transmit, via the network, the action data structure to the client device to cause the client device to generate an output audio signal based on the action data structure. The output audio signal can include the digital component received via the digital component provider device and the first audio chime retrieved from the memory of the client device.

Figure 4:
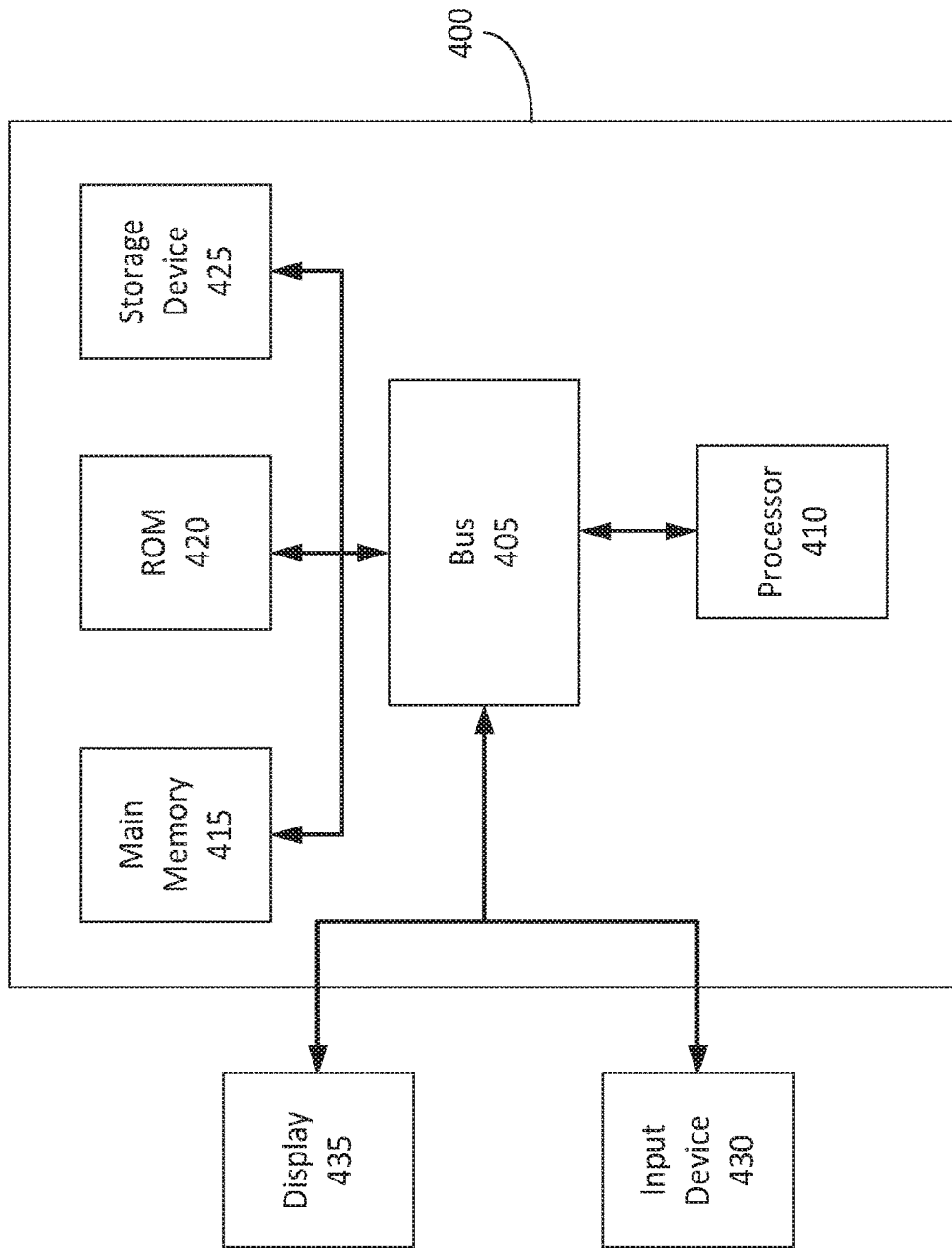
FIG. 4 is a block diagram illustrating a general architecture for a computer system that can be employed to implement elements of the systems depicted in FIG. 1 and FIG. 2, and the method depicted in FIG. 3.

FIG. 4 is a block diagram of an example computer system 400. The computer system or computing device 400 can include or be used to implement the system 100, or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 124.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The digital component selector component 114, chime generator component 116, synthesizer component 118 or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the digital component provider device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the digital component selector component 114, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method implemented by one or more processors, the method comprising:
    receiving, by a computing device, a plurality of audio chimes, each audio chime of the plurality of audio chimes corresponding to a particular digital component provider device that has provided an audio-based response to at least one historical voice-based request associated with the computing device;
    storing the plurality of audio chimes in a memory of the computing device;
    providing, to a data processing system, an input audio signal detected by a sensor of the computing device;
    receiving, from the data processing system, an action data structure that includes an indication of a particular audio chime included in the plurality of audio chimes stored by the computing device; and
    generating, by the computing device, based on the action data structure, an output audio signal that includes (i) the particular audio chime, retrieved from the memory of the computing device, and (ii) a digital component received via the particular digital component provider device corresponding to the particular audio chime.

2. The method according to claim 1, further comprising:
    for each of the particular digital component provider devices:
        receiving, by the data processing system, from the particular digital component provider device, a request to register the audio chime; and
        in response to receiving the request to register the audio chime:
            identifying, by the data processing system, the audio chime corresponding to the particular digital component provider device; and
            storing, by the data processing system, the audio chime and an assigned identifier that corresponds to the particular digital component provider device.

3. The method according to claim 2, further comprising, for each of the particular digital component provider devices, determining, by the data processing system, that the request to register the audio chime is approved,
    wherein identifying the audio chime and storing the audio chime and the assigned identifier are further in response to determining that the request to register the audio chime is approved.

4. The method according to claim 3, wherein the request to register the audio chime is approved based on a data quality score of the digital component provider device.

5. The method according to claim 2, wherein, for each of the particular digital component provider devices, identifying the audio chime corresponding to the particular digital component provider device comprises:
    accessing a website associated with the particular digital component provider device; and
    identifying, via the website, the audio chime.

6. The method according to claim 1, wherein each of the at least one historical voice-based request associated with the computing device is within a particular time interval.

7. A computer program product comprising one or more computer-readable storage media having program instructions collectively stored on the one or more computer-readable storage media, the program instructions executable to:
    receive, by a computing device, a plurality of audio chimes, each audio chime of the plurality of audio chimes corresponding to a particular digital component provider device that has provided an audio-based response to at least one historical voice-based request associated with the computing device;
    store the plurality of audio chimes in a memory of the computing device;
    provide, to a data processing system, an input audio signal detected by a sensor of the computing device;
    receive, from the data processing system, an action data structure that includes an indication of a particular audio chime included in the plurality of audio chimes stored by the computing device; and
    generate, by the computing device, based on the action data structure, an output audio signal that includes (i) the particular audio chime, retrieved from the memory of the computing device, and (ii) a digital component received via the particular digital component provider device corresponding to the particular audio chime.

8. The computer program product according to claim 7, wherein the program instructions are further executable to:
for each of the particular digital component provider devices:
receive, by the data processing system, from the particular digital component provider device, a request to register the audio chime; and
in response to receiving the request to register the audio chime:
identify, by the data processing system, the audio chime corresponding to the particular digital component provider device; and
store, by the data processing system, the audio chime and an assigned identifier that corresponds to the particular digital component provider device.

9. The computer program product according to claim 8, wherein:
the program instructions are further executable to, for each of the particular digital component provider devices, determine, by the data processing system, that the request to register the audio chime is approved; and
identifying the audio chime and storing the audio chime and the assigned identifier are further in response to determining that the request to register the audio chime is approved.

10. The computer program product according to claim 9, wherein the request to register the audio chime is approved based on a data quality score of the digital component provider device.

11. The computer program product according to claim 8, wherein, for each of the particular digital component provider devices, identifying the audio chime corresponding to the particular digital component provider device comprises:
accessing a website associated with the particular digital component provider device; and
identifying, via the website, the audio chime.

12. The computer program product according to claim 7, wherein each of the at least one historical voice-based request associated with the computing device is within a particular time interval.

13. A system comprising:
a processor, a computer-readable memory, one or more computer-readable storage media, and program instructions collectively stored on the one or more computer-readable storage media, the program instructions executable to:
receive, by a computing device, a plurality of audio chimes, each audio chime of the plurality of audio chimes corresponding to a particular digital component provider device that has provided an audio-based response to at least one historical voice-based request associated with the computing device;
store the plurality of audio chimes in a memory of the computing device;
provide, to a data processing system, an input audio signal detected by a sensor of the computing device;
receive, from the data processing system, an action data structure that includes an indication of a particular audio chime included in the plurality of audio chimes stored by the computing device; and
generate, by the computing device, based on the action data structure, an output audio signal that includes (i) the particular audio chime, retrieved from the memory of the computing device, and (ii) a digital component received via the particular digital component provider device corresponding to the particular audio chime.

14. The system according to claim 13, wherein the program instructions are further executable to:
for each of the particular digital component provider devices:
receive, by the data processing system, from the particular digital component provider device, a request to register the audio chime; and
in response to receiving the request to register the audio chime:
identify, by the data processing system, the audio chime corresponding to the particular digital component provider device; and
store, by the data processing system, the audio chime and an assigned identifier that corresponds to the particular digital component provider device.

15. The system according to claim 14, wherein:
the program instructions are further executable to, for each of the particular digital component provider devices, determine, by the data processing system, that the request to register the audio chime is approved; and
identifying the audio chime and storing the audio chime and the assigned identifier are further in response to determining that the request to register the audio chime is approved.

16. The system according to claim 15, wherein the request to register the audio chime is approved based on a data quality score of the digital component provider device.

17. The system according to claim 14, wherein, for each of the particular digital component provider devices, identifying the audio chime corresponding to the particular digital component provider device comprises:
accessing a website associated with the particular digital component provider device; and
identifying, via the website, the audio chime.

18. The system according to claim 13, wherein each of the at least one historical voice-based request associated with the computing device is within a particular time interval.

* * * * *